US007770192B2

(12) United States Patent  (10) Patent No.: US 7,770,192 B2
Wang  (45) Date of Patent: Aug. 3, 2010

(54) DVD MECHANISM SYSTEM FOR ADJUSTING AN INCLINED STATE

(75) Inventor: Ta-Hsiang Wang, Hsinchu (TW)

(73) Assignee: Lite-On It Corporation, Hsinchu (TW)

( * ) Notice: Subject to any disclaimer, the term of this patent is extended or adjusted under 35 U.S.C. 154(b) by 620 days.

(21) Appl. No.: 11/834,061

(22) Filed: Aug. 6, 2007

(65) Prior Publication Data

US 2008/0163271 A1 Jul. 3, 2008

(30) Foreign Application Priority Data

Dec. 29, 2006 (TW) .............................. 95150059 A

(51) Int. Cl.
*G11B 7/08* (2006.01)
(52) U.S. Cl. ..................................... 720/691
(58) Field of Classification Search ................. 720/651, 720/691, 692, 698, 700
See application file for complete search history.

(56) References Cited

U.S. PATENT DOCUMENTS

| | | | |
|---|---|---|---|
| 6,859,933 B2* | 2/2005 | Park et al. .................. | 720/651 |
| 7,013,472 B2* | 3/2006 | Toyama et al. .............. | 720/651 |
| 7,120,920 B1* | 10/2006 | Maeda ....................... | 720/692 |
| 7,185,350 B2* | 2/2007 | Hong et al. ................. | 720/698 |
| 7,237,246 B2* | 6/2007 | Chang ........................ | 720/692 |
| 7,243,359 B2* | 7/2007 | Saito et al. .................. | 720/692 |
| 7,260,821 B2* | 8/2007 | Amitani ...................... | 720/651 |
| 7,444,653 B2* | 10/2008 | Makino ...................... | 720/692 |
| 7,493,631 B2* | 2/2009 | Omori et al. ................ | 720/700 |
| 7,538,974 B2* | 5/2009 | Wu .......................... | 360/97.02 |
| 2007/0083880 A1* | 4/2007 | Bae ........................... | 720/675 |

* cited by examiner

*Primary Examiner*—Angel A. Castro
(74) *Attorney, Agent, or Firm*—Ming Chow; Sinorica, LLC

(57) ABSTRACT

The present invention provides a DVD mechanism system that is for adjusting an inclined state and mounted on a carrying mechanism of the DVD player and comprises: a spindle motor for loading and rotating a DVD; an optical read-write head for reading and writing the information of the DVD; two guiding rods for loading the optical read-write head; and at least two two-way adjustable positioning elements; wherein the two two-way adjustable positioning elements are to fasten the DVD mechanism on at least two positioning structures of the carrying mechanism in order to adjust the inclined state of the DVD mechanism.

8 Claims, 3 Drawing Sheets

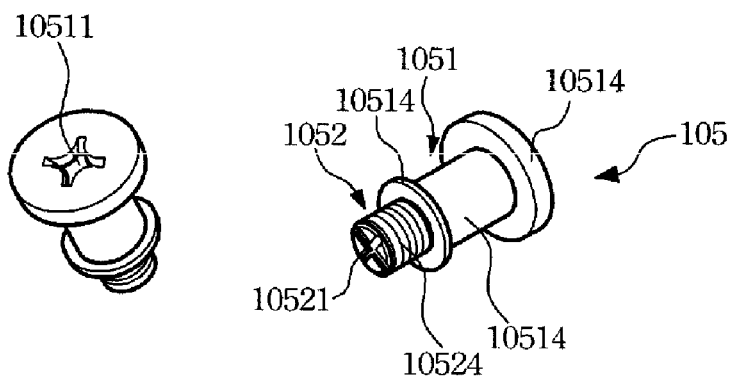
F I G . 3
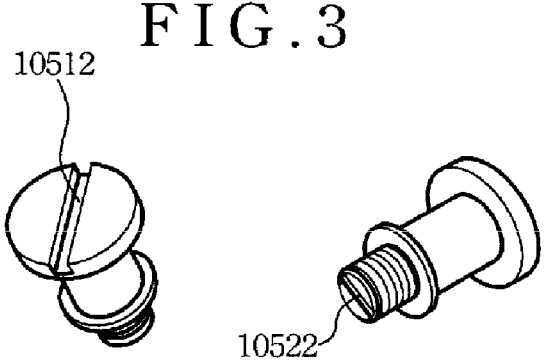
F I G . 4
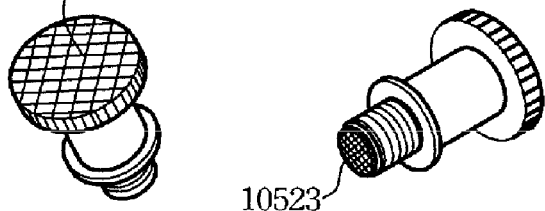
F I G . 5
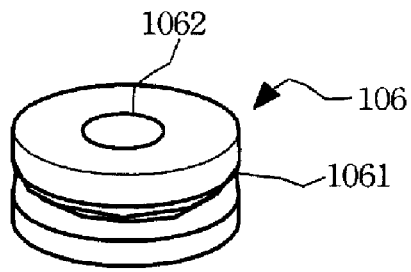
F I G . 6

DVD MECHANISM SYSTEM FOR ADJUSTING AN INCLINED STATE

BACKGROUND OF THE INVENTION

1. Field of the Invention

The present invention generally relates to a DVD mechanism system, more particularly to a DVD mechanism system being capable of adjusting an inclined state thereof.

2. Description of the Prior Art

There are several types of specifications of DVD, such as DVD+R, DVD-R, DVD+RW, DVD-RW, DVD Double Layer, DVD RAM, Blue-ray Disk, etc. constituted by CD-ROM, DVD Forum, DVD Alliance, etc. So that the hardware of a DVD player tends to approach more precise specifications and more capacity for marketing.

The accuracy for assembling DVD components is an important factor except for that of the precision of each component. Thus, there are two issues derived according to the accuracy for assembling DVD components. One is related to the comparative positions of components in the DVD player or the corresponsive locations of each component and peripherals thereof; the other is the position relationships for the DVD mechanism system of the DVD player and the surrounded components thereof. The present invention will discuss the second issue without the first issue.

The volume of a slim suck-in DVD player is smaller than a general semi-high DVD player, so the inner space of the slim suck-in DVD player is very limited. If the position relationships for the DVD mechanism system of the DVD player and the surrounded components thereof are not meeting the requirements, such as happening an inclined state of the DVD mechanism system to cause the highly rotating DVD on a spindle motor touching the casing of the DVD player, the inner structures of the DVD player, etc. or making noisy, and the DVD player may be easily damaged.

Further, according to the manufacturing procedures of the DVD player, the inclined state is caused and found after assembling the DVD player, continuously the DVD player will be dismantled, re-adjusted, and re-assembled for calibration. Above procedures are standard procedures for prior arts, but occupy much time for quality assurance and manufacturing cost. Hence, to develop a DVD mechanism system that can adjust the inclined state is an important issue to the persons skilled in the art.

SUMMARY OF THE INVENTION

The primary objective of the present invention is to provide a DVD mechanism system for adjusting an inclined state in order to prevent that of happening the inclined state of the DVD mechanism system to cause a highly rotating DVD on a spindle motor touching the casing of the DVD player, the inner structures of the DVD player, etc. or making noisy.

The secondary objective of the present invention is to provide the DVD mechanism system for adjusting the inclined state in order to directly solve the problem of the inclination if the inclination happens after assembling the DVD player and eliminate the procedures of dismantling, re-adjusting, and re-assembling. It is then that both the defect rate and the manufacturing cost are decreased.

The present invention provides the DVD mechanism system for adjusting the inclined state and mounted on a carrying mechanism of the DVD player, comprising: a spindle motor for loading and rotating a DVD; an optical read-write head for reading and writing the information of the DVD; two guiding rods for loading the optical read-write head; and at least two two-way adjustable positioning elements; wherein the two two-way adjustable positioning elements are to fasten the DVD mechanism on at least two positioning structures of the carrying mechanism in order to adjust the inclined state of the DVD mechanism.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein:

FIG. 3 illustrates a schematic view of a first preferred embodiment of a two-way adjustable positioning element of the present invention;

FIG. 4 illustrates a schematic view of a second preferred embodiment of the two-way adjustable positioning element of the present invention;

FIG. 5 illustrates a schematic view of a third preferred embodiment of the two-way adjustable positioning element of the present invention; and FIG. 6 illustrates a schematic view of a preferred embodiment of a damping element of the present invention.

DETAILED DESCRIPTION OF THE INVENTION

Figure 1:
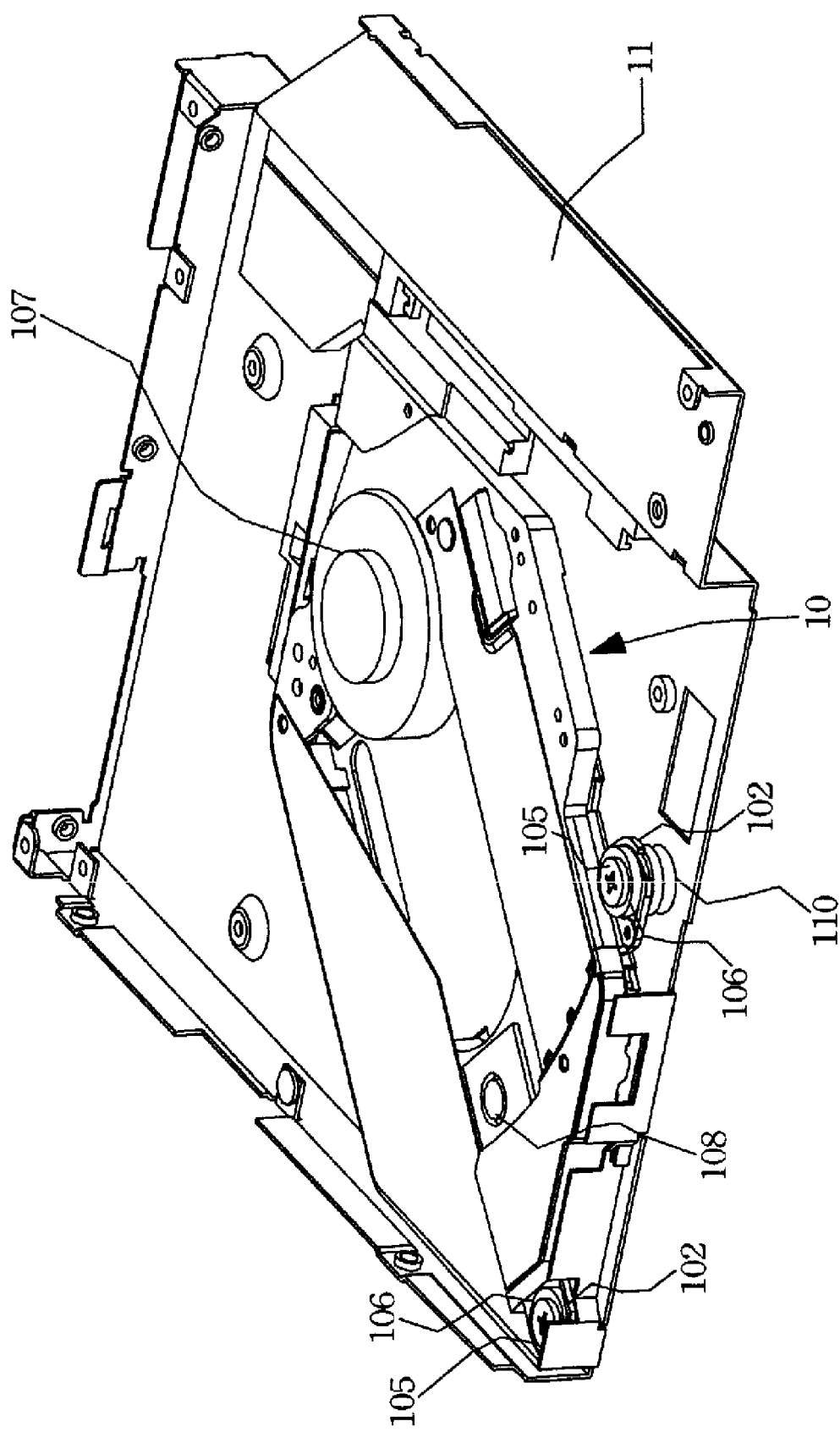
FIG. 1 illustrates a schematic 3-D view of a preferred embodiment of a DVD mechanism system for adjusting an inclined state of the present invention.
Figure 2:
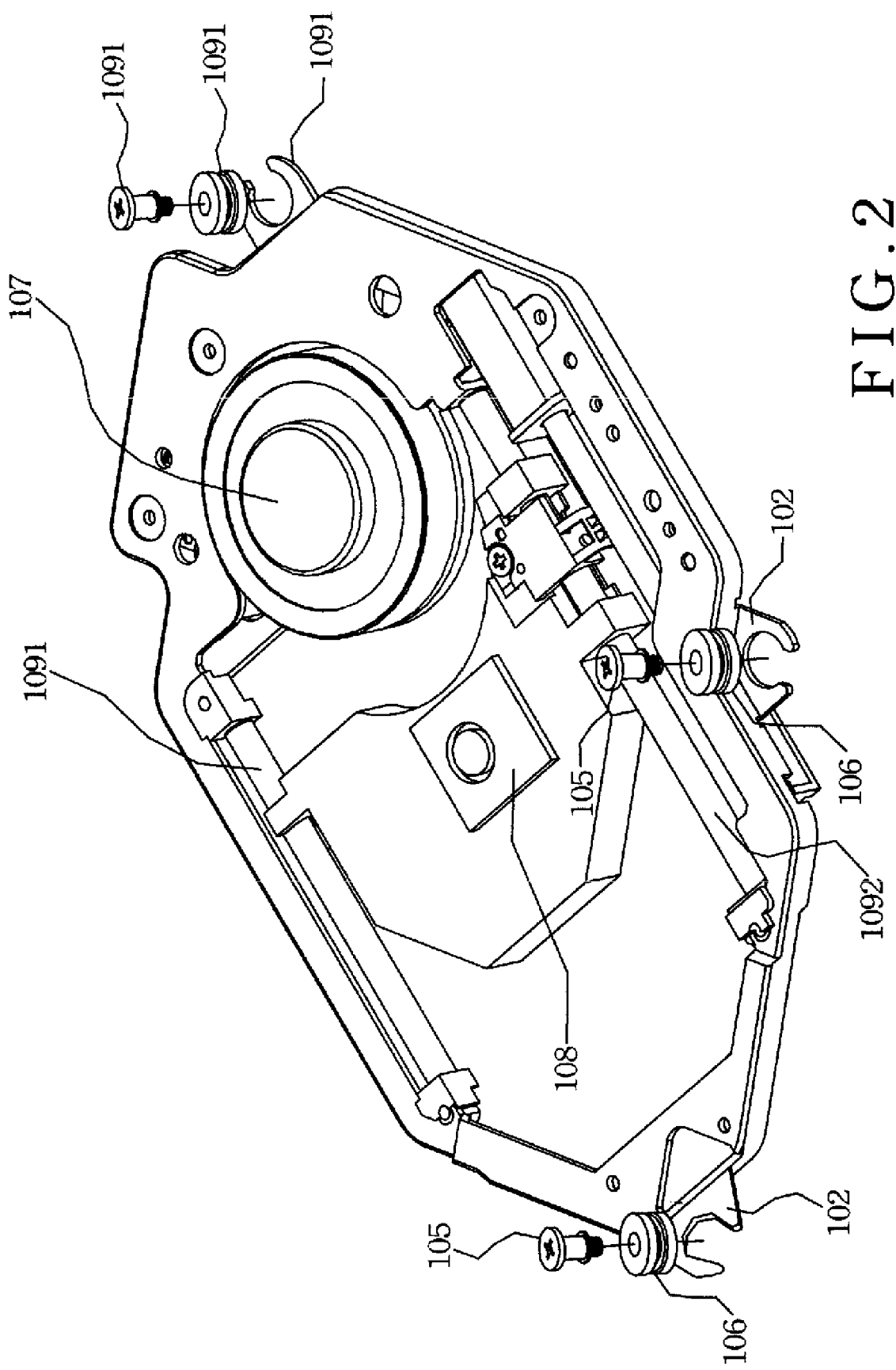
FIG. 2 illustrates a schematic partially exploded view of the preferred embodiment of the DVD mechanism system for adjusting the inclined state of the present invention.

With references to FIG. 1 and FIG. 2, FIG. 1 illustrates a schematic 3-D view of a preferred embodiment of a DVD mechanism system for adjusting an inclined state of the present invention, and FIG. 2 illustrates a schematic partially exploded view of the preferred embodiment of the DVD mechanism system for adjusting the inclined state of the present invention. The DVD mechanism system 10 for adjusting the inclined state of the present invention is mounted on a carrying mechanism 11 of a DVD player and includes: two guiding rods 1091 and 1092; a spindle motor 107 for loading and rotating a DVD; and an optical read-write head 108 for reading and writing the information of the DVD; wherein the optical read-write head 108 moves back and forth on the two guiding rods 1091 and 1092 in order to read and write the information of the DVD.

The DVD mechanism system 10 comprises at least two two-way adjustable positioning elements 105, but there are three two-way adjustable elements 105 for the preferred embodiment, as shown in FIG. 2. The carrying mechanism 11 has three positioning structures 110 comparative to the three two-way adjustable elements 105, and there is only one positioning structure 110 shown in FIG. 1. The cooperation of the positioning structures 110 and the two-way adjustable positioning elements 105 lets the DVD mechanism system 10 be fastened on the carrying mechanism 11 and adjusted the inclined state thereof.

Besides, the DVD mechanism system 10 further comprises at least one damping element 106, and there are two damping elements 106 as shown in FIG. 1 and FIG. 2. The two damping elements 106 are put around the two two-way adjustable positioning elements 105 so as to buffer the vibrations of the DVD mechanism system 10.

With references to FIG. 3, FIG. 4, and FIG. 5, those figures illustrate three schematic views of a first preferred embodiment, a second preferred embodiment, and a third preferred embodiment of the two-way adjustable positioning element of the present invention. The two-way adjustable positioning element 105 as shown in FIG. 3 will be an example and described as follows.

Referring to FIG. 3, the two-way adjustable positioning element 105 includes a first element 1051 and a second element 1052, wherein the first element 1051 is integrated with the second element 1052. The first element 1051 has a first adjusting structure 10511, two flanges 10514, and a connecting portion 10515, the connecting portion 10515 shaped as a cylinder and the two flanges 10514 are connected each other in order to dispose the damping elements 106. The second element 1052 has a second adjusting structure 10521 and a thread portion 10524, so that the second element 1052 is fastened on the positioning structure 110, and the DVD mechanism system 10 is thus fixed on the carrying mechanism 11 by means of the two-way adjusting elements 105. For the preferred embodiment, the positioning structure 110 is a screw hole 110, which cooperates with the thread portion 10524 of the two-way adjustable positioning element 105.

Referring to FIG. 3 to FIG. 5, the first adjusting structure 10511 and the second adjusting structure 10521 can be cross-head grooves 10511 and cross-head grooves 10521, a slot groove 10512 and a slot groove 10522, or a rough surface 10513 and a rough surface 10523. However the first adjusting structure 10511 and the second adjusting structure 10521 could be different structures, such as the cross-head grooves 10511 and the slot groove 10522.

Referring to FIG. 1, FIG. 2, and FIG. 6, the DVD mechanism system 10 includes three damping element 106, which cooperate with the two-way adjustable positioning elements 105 in order to buffer the vibrations of the DVD mechanism system 10. The damping element 106 is a rubber member and has a slot 1061 and a through hole 1062, as shown in FIG. 6, which illustrates a schematic view of a preferred embodiment of the damping element 106 of the present invention. The through hole 1062 is put around the connecting portion 10515 of the two-way adjustable positioning element 105, and therefore the damping element 106 is disposed between the two flanges 10514. Besides, the DVD mechanism system 10 further has a plurality of fixing frames 102, so that each fixing frame 102 can embed in the slot 1061 of the damping element 106. The damping element 106 is positioned at the DVD mechanism system 10, as shown in FIG. 1.

According to the preferred embodiments of the present invention, each damping element 106 is put around the connecting portion 10515 of the two-way adjustable positioning element 105 firstly while assembling the DVD mechanism system 10 and the carrying mechanism 11, the combination of the damping element 106 and the two-way adjustable positioning element 105 is completed. Secondly, the slot 1061 of the damping element 106 is embedded by the fixing frame 102 of the DVD mechanism system 10 so as to combine the damping element 106 and the slot 1061. At last, the thread portion 10524 of the two-way adjustable positioning element 105 is fastened in the screw hole 110 of the carrying mechanism 11.

The inclined state of the DVD mechanism system 10 can be initially adjusted while assembling. For example, when the first adjusting structure of the two-way adjustable positioning element 105 is the cross-head grooves 10511, a cross-head screwdriver cooperates with the cross-head grooves 10511 to adjust the depth of the thread portion 10524 in the screw hole 110, so that the inclined state of the DVD mechanism system 10 can be adjusted properly.

The carrying mechanism 11 further has three openings, which are disposed below the screw hole 110 so as to protrude the second adjusting structure 10521 of the two-way adjustable positioning element 105 out of the DVD player. The cross-head screwdriver can penetrate upward and through the opening to adjust the depth of the two-way adjustable positioning element 105 in the screw hole 110 from the bottom of the DVD player in order to adjust the inclined state of the DVD mechanism system 10 properly.

After assembling the DVD mechanism system 10 and the carrying mechanism 11, a cover is disposed on the DVD mechanism system 10 for protection. While the DVD player is in test and a condition is found, that is, the DVD mechanism system 10 is inclined to cause the DVD on the spindle motor 107 touching other components or structures while the DVD is in rotation, and further damage the DVD or the DVD player. To avoid such condition, a screwdriver can be inserted through the opening to adjust the second adjusting structure 1052 of the two-way adjustable positioning element 105 so as to adjust a proper depth of the thread portion 10524 in the screw hole 110. Thus, the condition will not be happening, and the way of adjustment may not need to dismantle the cover.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A DVD mechanism system for adjusting an inclined state and mounted on a carrying mechanism of a DVD player, comprising:
   a spindle motor for loading and rotating a DVD;
   an optical read-write head for reading and writing the information of the DVD;
   two guiding rods for loading the optical read-write head; and
   at least two two-way adjustable positioning elements;
   wherein the two two-way adjustable positioning elements are to fasten the DVD mechanism on at least two positioning structures of the carrying mechanism in order to adjust the inclined state of the DVD mechanism.

2. The DVD mechanism system according to claim 1, wherein each of the two two-way adjustable positioning elements comprises:
   a first element; and
   a second element;
   wherein the first element is integrated with the second element, each of the first element and the second element has an adjusting structure.

3. The DVD mechanism system according to claim 2, wherein the adjusting structure is selected from the group of: slot groove, cross-head grooves, and rough surface.

4. The DVD mechanism system according to claim 2, wherein the second element has a thread portion, so that the second element is fastened on the positioning structure.

5. The DVD mechanism system according to claim 2, wherein the first element has a connecting portion and two flanges, the connecting portion and the two flanges are connected each other.

6. The DVD mechanism system according to claim 5, wherein a damping element is between the two flanges.

7. The DVD mechanism system according to claim 1, wherein the carrying mechanism comprises at least two openings, which are disposed below the positioning structures.

8. The DVD mechanism system according to claim 1, wherein the positioning structure is a screw hole.

* * * * *